US008807581B2

(12) United States Patent
Liao

(10) Patent No.: US 8,807,581 B2
(45) Date of Patent: Aug. 19, 2014

(54) HEAD TUBE RESET MECHANISM FOR A SCOOTER

(71) Applicant: Yvolve Sports Ltd., Dublin (IE)

(72) Inventor: Hsueh-Sen Liao, Hsin-Chu Hsien (TW)

(73) Assignee: Yvolve Sports Ltd, Dublin (IE)

( * ) Notice: Subject to any disclaimer, the term of this patent is extended or adjusted under 35 U.S.C. 154(b) by 21 days.

(21) Appl. No.: 13/849,151

(22) Filed: Mar. 22, 2013

(65) Prior Publication Data

US 2013/0257013 A1 Oct. 3, 2013

(30) Foreign Application Priority Data

Mar. 30, 2012 (TW) .............................. 101205948 A

(51) Int. Cl.
| B62M 1/00 | (2010.01) |
| B62K 19/18 | (2006.01) |
| B62K 15/00 | (2006.01) |
| B62K 19/30 | (2006.01) |
| B62K 3/00 | (2006.01) |

(52) U.S. Cl.
CPC ................. *B62K 19/18* (2013.01); *B62K 15/00* (2013.01); *B62K 19/30* (2013.01); *B62K 3/002* (2013.01)
USPC .................. 280/87.041; 280/272; 280/87.021

(58) Field of Classification Search
USPC ............ 280/270–272, 87.01, 87.021, 87.041
See application file for complete search history.

(56) References Cited

U.S. PATENT DOCUMENTS

| 6,739,606 | B2 * | 5/2004 | Rappaport | 280/87.041 |
| 6,908,090 | B2 * | 6/2005 | Chuang | 280/87.041 |
| 6,908,091 | B2 * | 6/2005 | Chuang | 280/87.041 |
| 6,991,242 | B2 * | 1/2006 | Teng et al. | 280/87.041 |
| 7,597,334 | B2 * | 10/2009 | Chen | 280/87.041 |
| 7,926,825 | B2 * | 4/2011 | Chen | 280/87.043 |
| 2002/0063406 | A1 * | 5/2002 | Feng | 280/87.041 |
| 2005/0001399 | A1 * | 1/2005 | Yeo et al. | 280/87.041 |
| 2005/0082778 | A1 * | 4/2005 | Chuang | 280/87.041 |

\* cited by examiner

*Primary Examiner* — Kevin Hurley
*Assistant Examiner* — Michael Stabley
(74) *Attorney, Agent, or Firm* — Jackson IPG PLLC

(57) ABSTRACT

A head tube reset mechanism for a scooter includes a connector for installing rear wheels and a head tube for installing a front wheel and a handle. A front end of the connector is a jacket tube and a filling slot keeping a predetermined spacing from the jacket tube. The head tube includes a pivot sheathing into the jacket tube and a limiting unit extending into the filling slot. An elastomer is installed between the filling slot of the connector and the limiting unit. The handle and the front wheel on the head tube swing left and right against the pivot along with the head tube to achieve the effects of exercise and entertainment, when the scooter glides forward. Moreover, a buffering and resetting effect is formed by the elastomer. Therefore, a head tube reset mechanism for a scooter, being simple in structure and assembled conveniently, is provided.

10 Claims, 10 Drawing Sheets

HEAD TUBE RESET MECHANISM FOR A SCOOTER

BACKGROUND OF THE INVENTION a) Field of the Invention

The present invention relates to a scooter, and more particularly to a head tube reset mechanism for a scooter, with the head tube reset mechanism being a simple structure and assembled conveniently.

b) Description of the Prior Art

A conventional scooter design with a triangular configuration and a handle that can swing left and right to drive and move the scooter body is shown in FIG. 1. A front end of the scooter body is provided primarily with a head tube 11, the head tube 11 is pivoted with a stem 21 that can rotate freely, and a front wheel 31 is connected to a lower end of the stem 21 through a front fork 22; whereas, an upper end of the stem 21 is installed with a handle 23. In addition, two sides of the scooter body are provided respectively with a rod 41 that is extended backward by a predetermined length. The two rods 41 are stretched outward by a predetermined included angle and two rear wheels 32 are provided respectively at a rear end of each rod 41. Therefore, a basic scooter structure that allows for riding stably is formed.

For other similar conventional scooters, in addition to that the handle 23 can be used to control the front wheel 31 to turn, by the design that the head tube 11 can swing left and right, a user can swing the front wheel 31 left and right at the same time when swinging the handle 23 left and right, and can roll the scooter forward along an S-shaped route while the front wheel 31 swings left and right, thereby achieving the effects of exercise and entertainment when the scooter glides forward.

Moreover, to increase the smoothness when riding the scooter and to achieve the effect of labor saving, the similar scooter is further provided with a reset mechanism that always keeps the head tube 11 at a central upright position. Referring to FIG. 2, under the condition that the head tube 11 of the scooter can swing left and right, a lower end of the head tube 11 is provided forward with a trunnion 111, and front ends of the two rods 41 are pivoted with the trunnion 111 by a bolt 12. A side of the head tube 11 opposite to the trunnion 111 is provided backward with a first shaft 112 that is sheathed with a rotation block 13. Two ends of the rotation block 13 are provided respectively with a second shaft 131 that is protruded toward the rod 41. The two rods 41 are provided respectively with a jacket tube 411 into which the second shaft 131 is extended. On the other hand, the jacket tube 411 of each rod 41 is provided with an elastomer 14 that encloses the second shaft 131.

In principle, when the head tube 11 swings left or right against the first shaft 112, a buffering and resetting effect should be gained under the restriction of the elastomer 14. However, the abovementioned conventional reset mechanism is complicated and tedious. Besides that, the elastomers 14 should be disposed between the second shafts 131 at the two sides of the rotation block 13 and the jacket tubes 411 of the two rods 41, which not only requires higher production cost and maintenance fees, but wastes more time and labor when assembling.

SUMMARY OF THE INVENTION

Accordingly, the primary object of the present invention is to provide a head tube reset mechanism for a scooter, with the head tube reset mechanism being a simple structure and assembled conveniently.

To achieve the abovementioned object, the head tube reset mechanism for a scooter, according to the present invention, is provided with a connector for installing rear wheels, and a head tube for installing a front wheel and a handle. A front end of the connector is provided with a jacket tube and a filling slot that keeps a predetermined spacing from the jacket tube. The head tube is installed at the front end of the connector and is provided with a pivot for sheathing into the jacket tube, and a limiting unit that is extended into the filling slot. Additionally, at least an elastomer is installed between the filling slot of the connector and the limiting unit of the head tube.

By the abovementioned characteristics of structures, when using the head tube reset mechanism for a scooter, according to the present invention, the handle and the front wheel that are installed on the head tube can swing left and right along with the head tube against the pivot, thereby achieving the effects of exercise and entertainment while gliding the scooter forward. Furthermore, under the functions of the elastomers and the limiting unit, a buffering effect is formed to the head tube and a resetting force is provided constantly to keep the head tube at a central upright position, allowing the scooter to glide more smoothly without wasting too much labor.

By the abovementioned characteristics of structures, the described connector is formed by welding a stamping panel with the jacket tube, and the filling slot is disposed between the jacket tube and the stamping panel.

The abovementioned jacket tube is sheathed with at least a sliding sleeve.

By the abovementioned characteristics of structures, two sides of the described connector are extended backward and outward in a diagonal direction and two side walls of the connector are provided respectively with a predetermined number of filling holes.

By the abovementioned characteristics of structures, the described limiting unit is constructed by two panels that are fixed on the head tube. Ends of the two panels opposite to the head tube are engaged together to form a plate with structural intensity; whereas, ends of the two panels facing the head tube are folded into a joint part that is engaged with the head tube.

In the abovementioned head tube reset mechanism for a scooter, an elastomer is installed between the filling slot of the connector and the limiting unit of the head tube. The elastomer is installed in the filling slot of the connector, and a front end of the elastomer is formed with an interference part for insertion with the limiting unit of the head tube.

The abovementioned elastomer can be a square block or a cylinder.

In the described head tube reset mechanism for a scooter, two elastomers are installed between the filling slot of the connector and the limiting unit of the head tube. The two elastomers are disposed respectively at two sides of the limiting unit of the head tube, so as to be installed in the filling slot of the connector.

The abovementioned two elastomers are a block of elastomer, respectively.

The abovementioned two elastomers are a spring, respectively.

By the abovementioned characteristics of structures, in the described head tube reset mechanism for a scooter, an elastomer is installed between the filling slot of the connector and the limiting unit of the head tube. The limiting unit is constructed by a slot-shaped panel that is fixed on the head tube, and an end of the limiting unit opposite to the head tube is formed with an opening. The elastomer is disposed in the limiting unit and the connector is protruded at the filling slot with a plate unit that is extended into the limiting unit. An end of the elastomer facing the connector is provided with an interference part for insertion with the plate unit.

The abovementioned elastomer can be a square block.

By the abovementioned characteristics of structures, in the head tube reset mechanism for a scooter, two elastomers are installed between the filling slot of the connector and the limiting unit of the head tube. The limiting unit is constructed by a slot-shaped panel that is fixed on the head tube, and an end of the limiting unit opposite to the head tube is formed with an opening. The connector is protruded at the filling slot with a plate unit that is extended into the limiting unit. The two elastomers are disposed respectively at two sides of the plate unit of the head tube, so as to be installed in the limiting unit.

The abovementioned two elastomers are a block of elastomer, respectively.

The abovementioned two elastomers are a spring, respectively.

By the abovementioned characteristics of structures, in the head tube reset mechanism for a scooter, an elastomer is installed between the filling slot of the connector and the limiting unit of the head tube. The filling slot of the connector is a round hole and the elastomer is an elastic cylinder that is installed in the filling slot. The elastomer is provided with an interference part for insertion with the limiting unit of the head tube. The limiting unit is a rod-shaped unit that is fixed on the head tube, and the interference part of the elastomer is a round hole.

By the abovementioned characteristics of structures, the described head tube is provided with an end cap at a tail end of the pivot to prevent the pivot from escaping out.

By the abovementioned characteristics of structures, the two sides of the described connector are installed respectively with a rod member, and a tail end of each rod member is installed with a rear wheel.

At least an elastic restoration element is disposed between the abovementioned each rod member and the connector.

By the abovementioned characteristics of structures, the described head tube is provided with a stem that can rotate freely. An upper end of the stem is installed with a handle; whereas, a lower end of the stem is installed with a front fork and a front wheel.

Specifically, the head tube reset mechanism for a scooter, according to the present invention, is provided with following effects:

1. The parts are simple, which reduces material and assembly costs relatively.
2. The parts are simple, which reduces maintenance fees relatively.
3. The entire head tube reset mechanism for a scooter includes the connector that is installed with the rear wheels, and the head tube that is installed with the front wheel and the handle, which facilitates the modularized design for the scooter.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
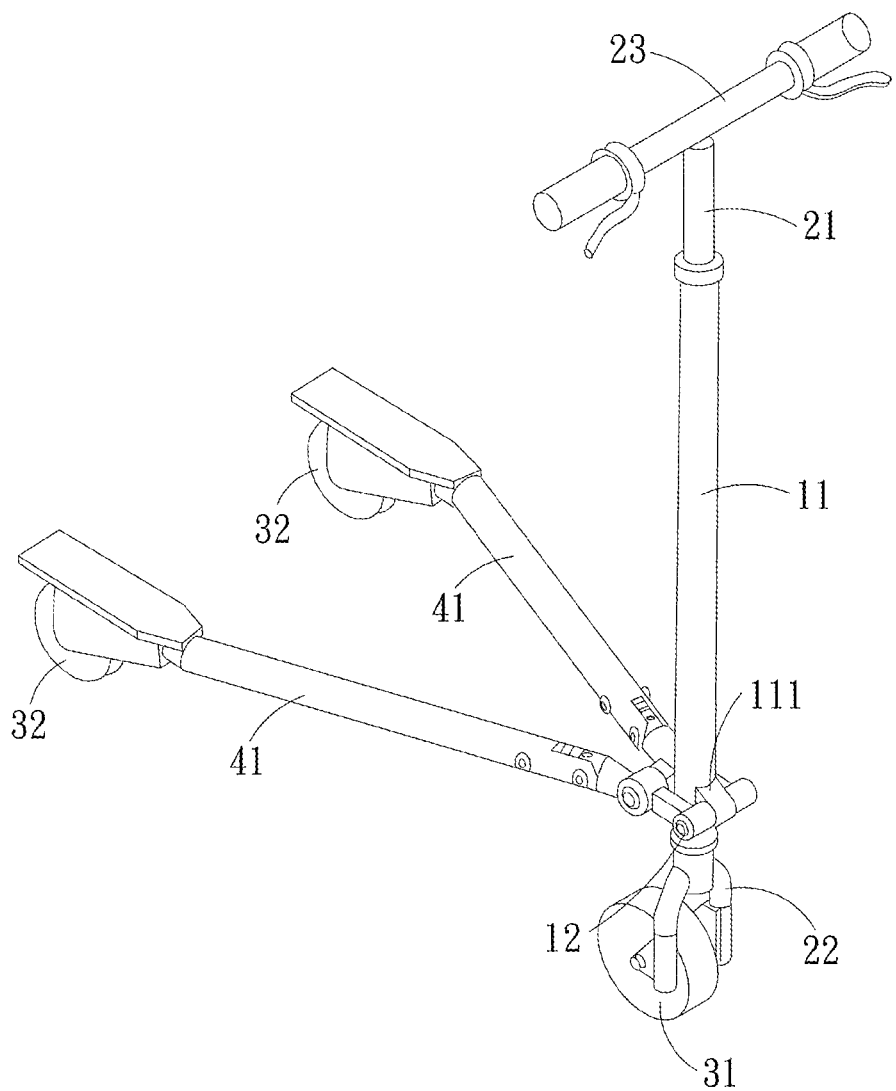
FIG. 1 shows a structural view of appearance of a conventional scooter.
Figure 2:
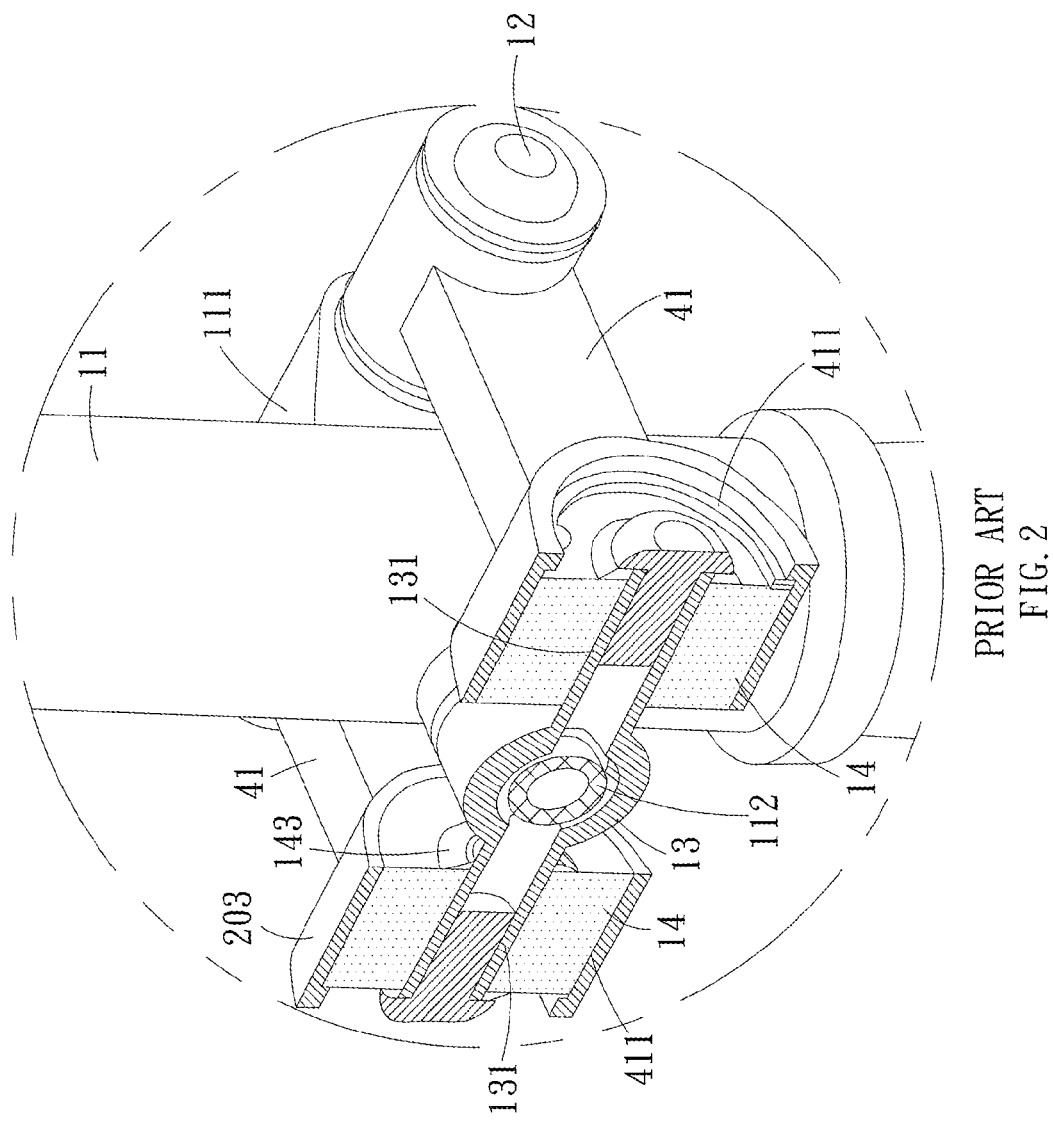
FIG. 2 shows a cutaway view of a head tube reset mechanism of the conventional scooter in FIG. 1.
Figure 3:
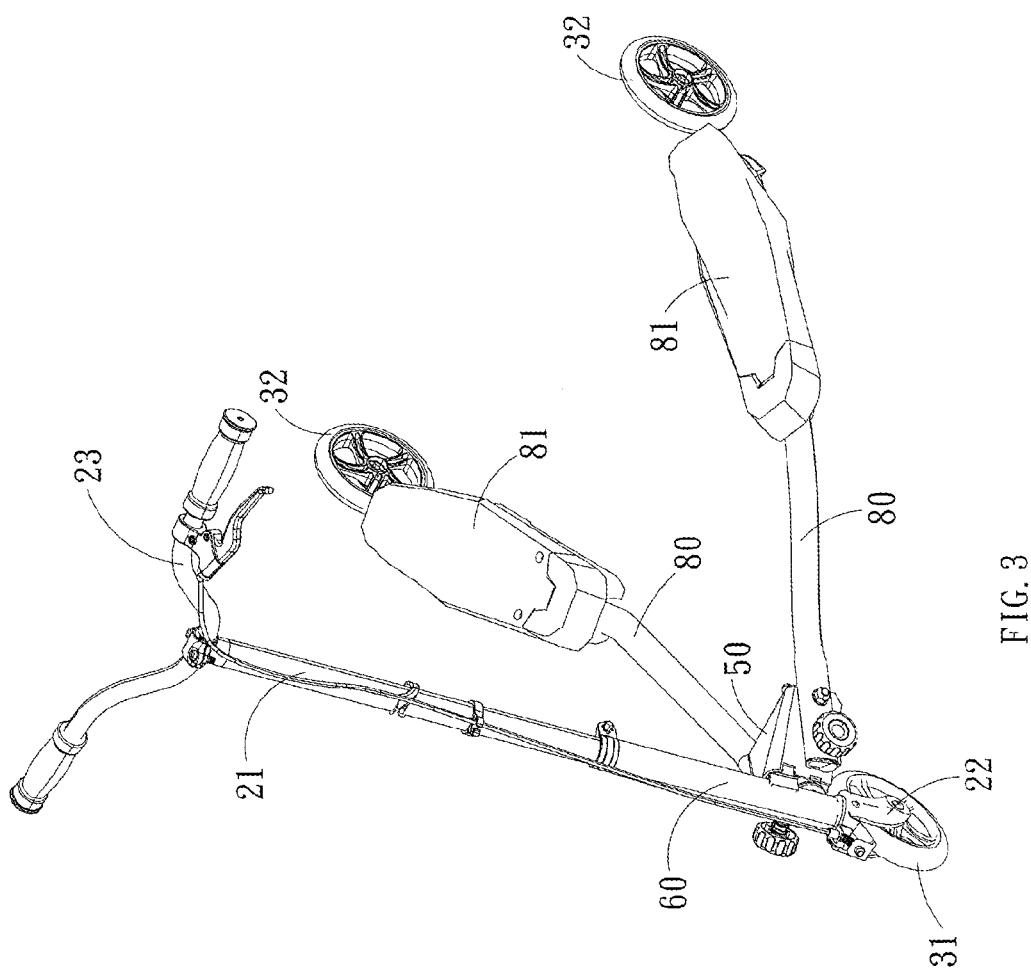
FIG. 3 shows a configuration drawing of using a head tube reset mechanism for a scooter, according to the present invention.
Figure 4:
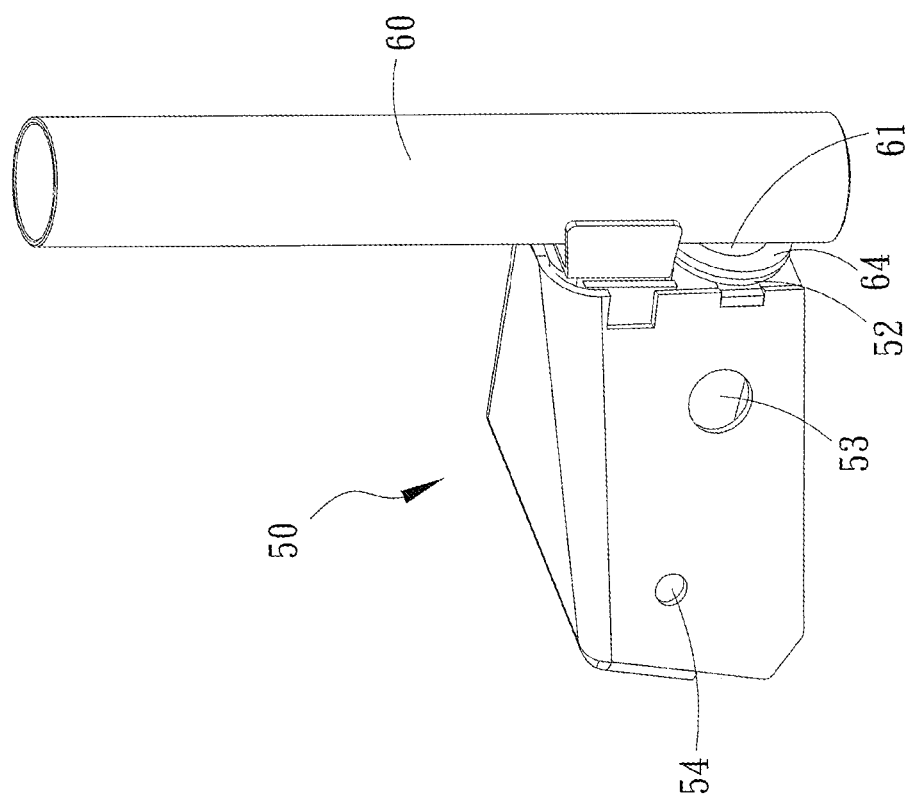
FIG. 4 shows a three-dimensional view of appearance of the head tube reset mechanism for a scooter, according to the present invention.
Figure 5:
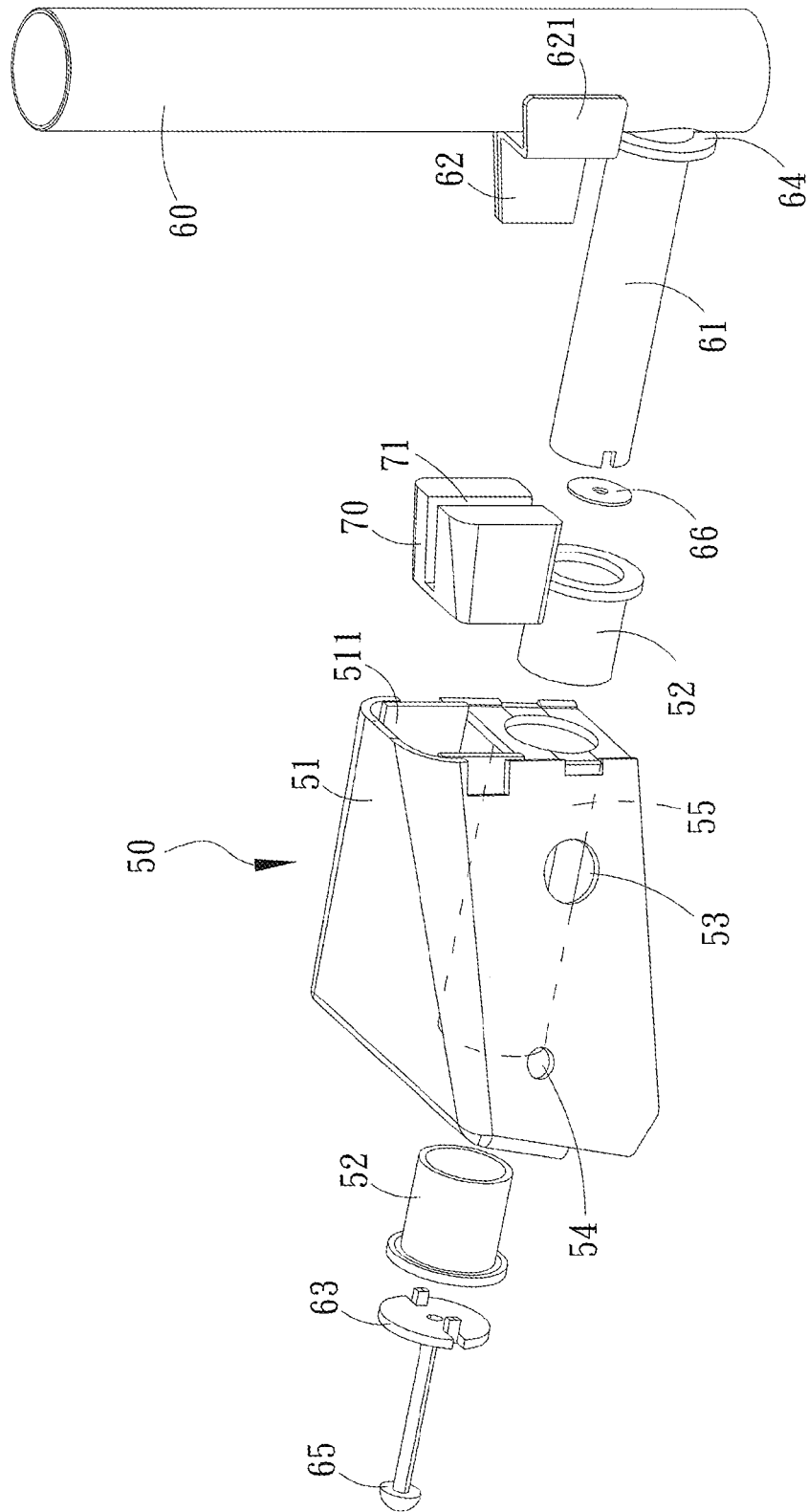
FIG. 5 shows an exploded structure view of a first embodiment of the head tube reset mechanism for a scooter, according to the present invention.

Referring to FIG. 3, it shows a configuration drawing of using a head tube reset mechanism for a scooter, according to the present invention. The head tube reset mechanism is basically constructed by a connector 50 for installing rear wheels 32, and a head tube 60 for installing a front wheel 31 and a handle 23. As shown in FIG. 4 and FIG. 5 at a same time, a front end of the connector 50 is provided with a jacket tube 55, and a filling slot 511 that keeps a predetermined spacing from the jacket tube 55. Upon implementing, the connector 50 can be made by welding a stamping panel 51 with the jacket tube 55, and the filling slot 511 is disposed between the jacket tube 55 and the stamping panel 51. In addition, the jacket tube 55 can be sheathed with a sliding sleeve 52, thereby providing the connector 50 that is relatively light in weight.

The head tube 60 is installed at the front end of the connector 50, and is provided with a pivot 61 that is sheathed into the jacket tube 55 and a limiting unit 62 that is extended into the filling slot 511. Upon implementing, the limiting unit 62 can be constructed by connecting two panels 621 that are fixed on the head tube 60. Ends of the two panels 621 opposite to the head tube 60 can be engaged together by welding to form a plate with structural intensity. Ends of the two panels 621 facing the head tube 60, on the other hand, are folded into a joint part to be engaged with the head tube 60. The joint part of the two panels 621 is also welded on the head tube 60.

At least an elastomer 70 is installed between the filling slot 511 of the connector 50 and the limiting unit 62 of the head tube 60. As shown in an embodiment in FIG. 5, for the entire head tube reset mechanism, an elastomer 70 is installed between the filling slot 511 of the connector 50 and the limiting unit 62 of the head tube 60. The elastomer 70 is installed in the filling slot 511 of the connector 50, and a front end of the elastomer 70 is formed with an interference part 71 for insertion with the limiting unit 62 of the head tube 60.

Figure 6:
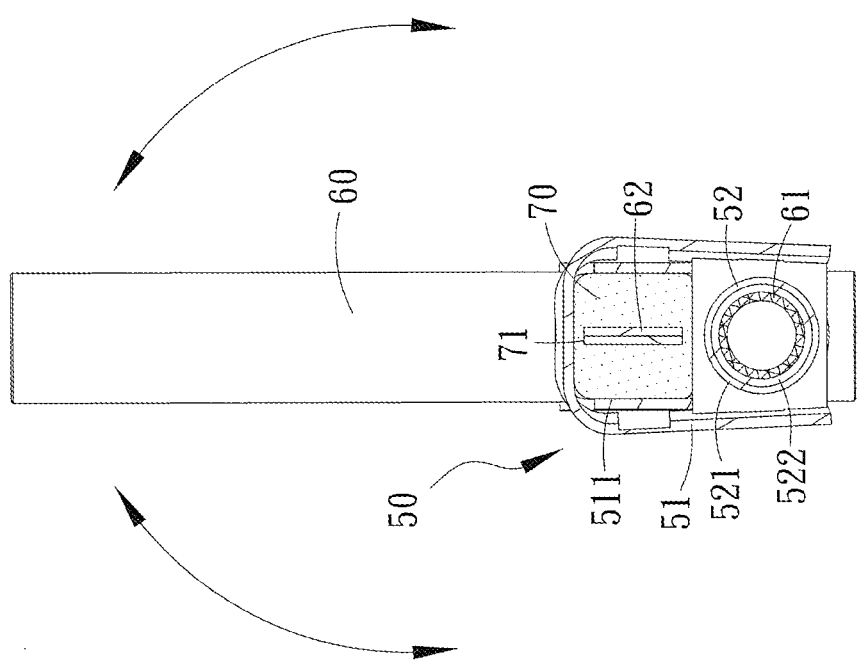
FIG. 6 shows a cutaway structure view of the head tube reset mechanism for a scooter, according to the present invention.

Upon implementing, the elastomer 70 is a block made by PU (Polyurethane) or rubber. By interference between the elastomer 70 and the limiting unit 62, the head tube 60 is limited. In addition, when the head tube 60 swings left or right against the pivot 61 when being subjected to an external force, the elastomer 70 can result in a buffering effect to the head tube 60 (as shown in FIG. 6) and always provide a resetting force to keep the head tube 60 at a central upright position.

Accordingly, by the abovementioned head tube reset mechanism for a scooter, a scooter rider can turn the handle 23 and swing the handle 23 left and right at a same time to swing the front wheel 31 left and right, as well as roll the scooter forward along an S-shaped route while the front wheel 31 swings left and right, thereby achieving the effects of exercise and entertainment for the entire scooter. Furthermore, the scooter can glide more smoothly without wasting too much labor. In particular, the assembly parts of the head tube reset mechanism are very simple, which reduces material cost, assembling cost, and subsequent maintenance fees.

Figure 7:
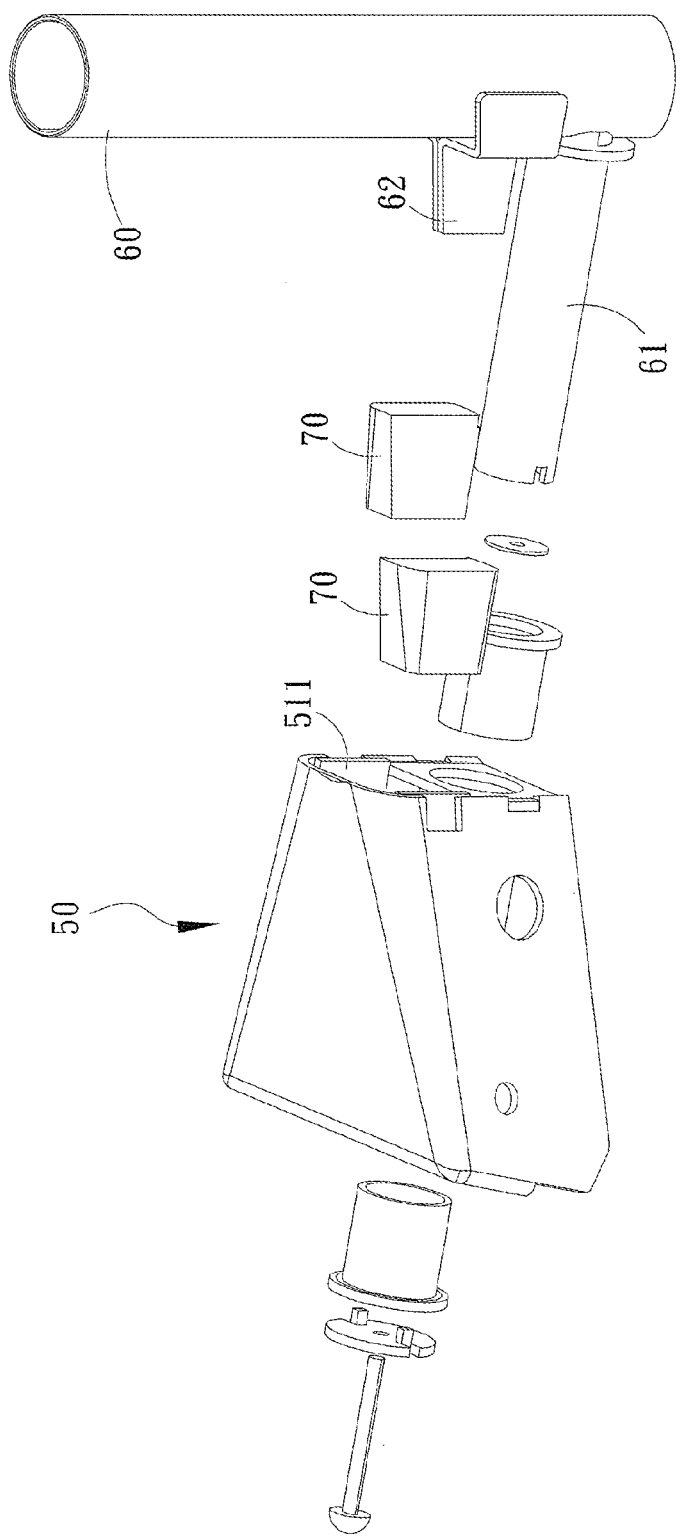
FIG. 7 shows an exploded structure view of a second embodiment of the head tube reset mechanism for a scooter, according to the present invention.
Figure 8:
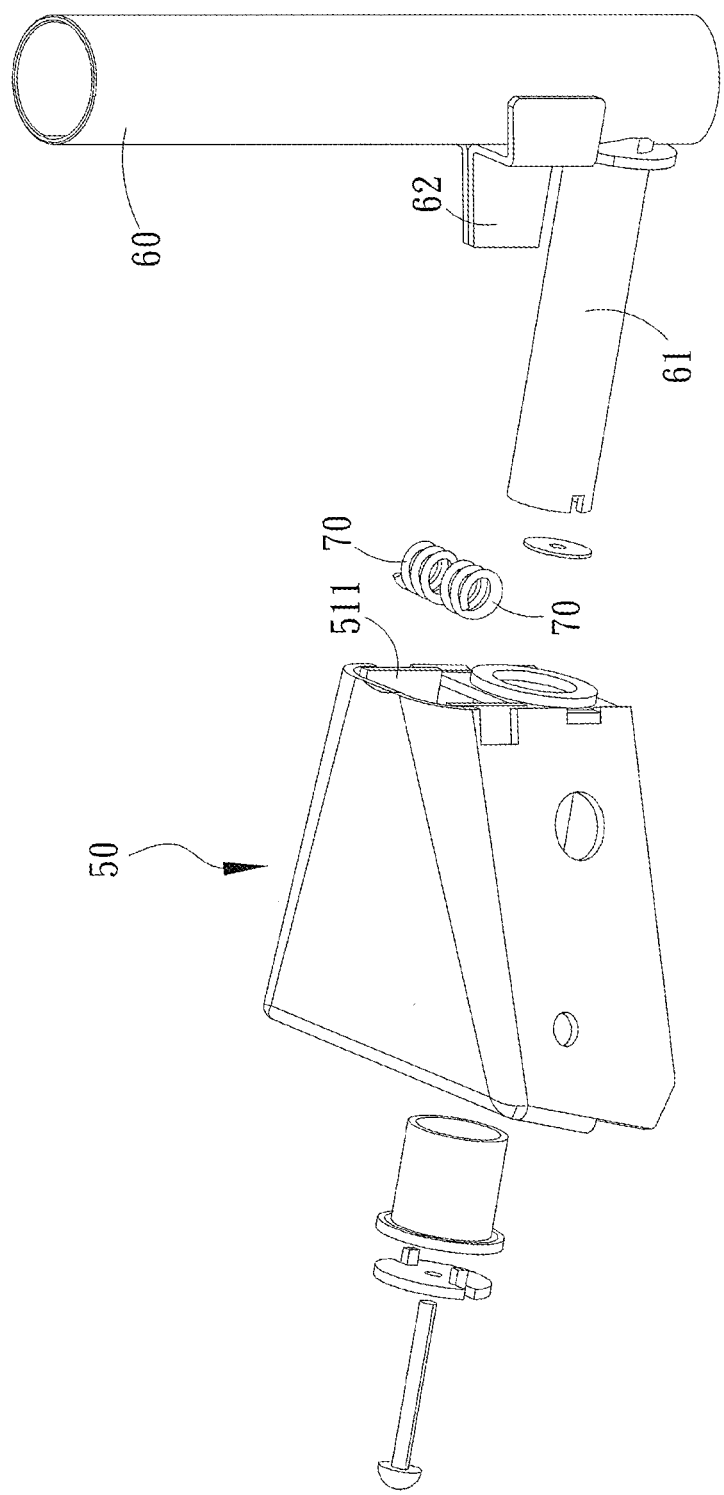
FIG. 8 shows an exploded structure view of a third embodiment of the head tube reset mechanism for a scooter, according to the present invention.

Besides that, as shown in a second embodiment in FIG. 7, two elastomers 70 can be installed between the filling slot 511 of the connector 50 and the limiting unit 62 of the head tube 60. The two elastomers 70 can be a block of elastomer respectively (as shown in FIG. 7) or a spring respectively (as shown in FIG. 8), and are disposed respectively at two sides of the limiting unit 62 of the head tube 60, so as to be installed in the filling slot 511 of the connector 50.

Figure 9:
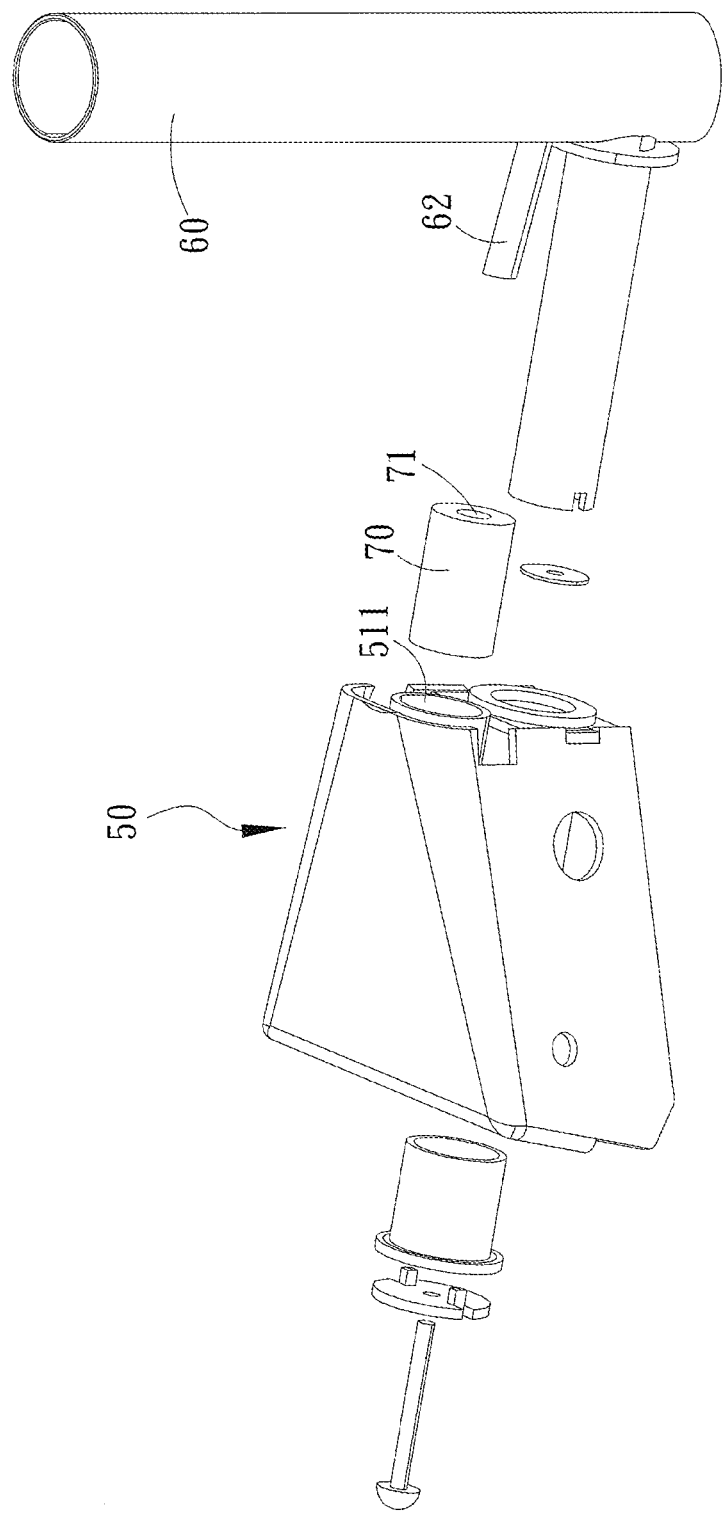
FIG. 9 an exploded structure view of a fourth embodiment of the head tube reset mechanism for a scooter, according to the present invention.

On the other hand, as shown in a fourth embodiment in FIG. 9, an elastomer 70 is installed between the filling slot 511 of the connector 50 and the limiting unit 62 of the head tube 60. The filling slot 511 of the connector 50 is a round hole and the elastomer 70 is an elastic cylinder that is installed in the filling slot 511. The elastomer 70 is provided with an interference part 71 for insertion with the limiting unit 62 of the head tube 60. The limiting unit 62 is a rod-shaped unit that is fixed on the head tube 60, and the interference part 71 of the elastomer 70 is a round hole.

Figure 10:
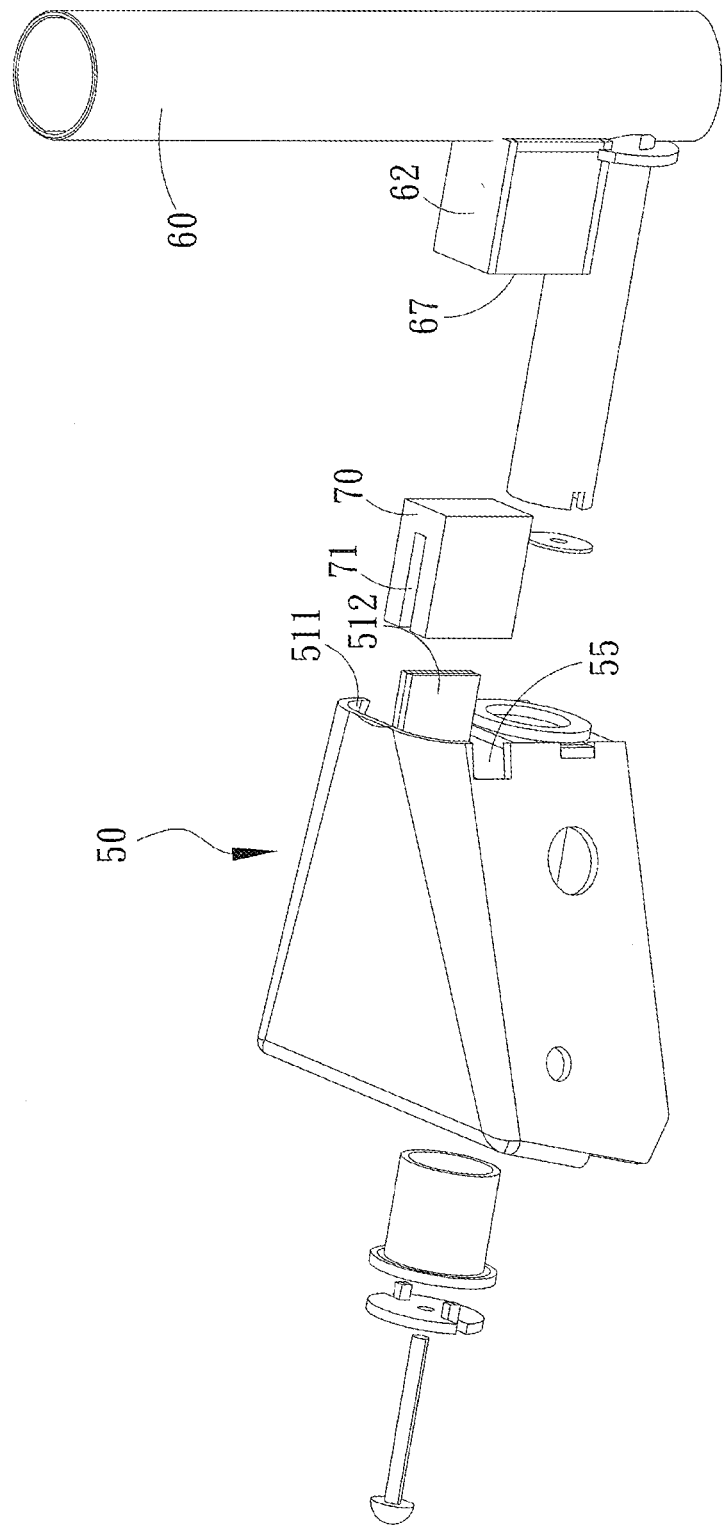
FIG. 10 an exploded structure view of a fifth embodiment of the head tube reset mechanism for a scooter, according to the present invention.

As shown in a fifth embodiment in FIG. 10, an elastomer 70 is installed between the filling slot 511 of the connector 50 and the limiting unit 62 of the head tube 60. The limiting unit 62 is constructed by a slot-shaped plate that is fixed on the head tube 60, and an end of the limiting unit 62 opposite to the head tube 60 is formed with an opening 67. The elastomer 70 is disposed in the limiting unit 62 and the connector 50 is protruded at the filling slot 511 with a plate unit 512 that is extended into the limiting unit 62. An end of the elastomer 70 facing the connector 50 is provided with an interference part 71 for insertion with the plate unit 512.

The elastomer 70 can be a square block as shown in the drawings, or can be a cylinder. In addition, the abovementioned limiting unit is constructed by a slot-shaped plate that is fixed on the head tube, and an end of the limiting unit opposite to the head tube is formed with an opening. Under a structural configuration that the connector is protruded at the filling slot with a plate unit extending into the limiting unit, two elastomers are installed between the filling slot of the connector and the limiting unit of the head tube. The two elastomers are disposed respectively at two sides of the plate unit of the head tube, so as to be installed in the limiting unit. Similarly, the two elastomers can be a block of elastomer respectively or a spring respectively.

The head tube 60 and the connector 50 can be assembled quickly only by sheathing the pivot 61 and the limiting unit 62 into the jacket tube 55 and the filling slot 511 of the connector 50 respectively, and by installing the elastomers 70 to positions. Furthermore, the head tube 60 can be further provided at a tail end of the pivot 61 with an end cap 63 to prevent the pivot 61 from escaping out.

Under a structural configuration that the abovementioned head tube reset mechanism is further provided at the tail end of the pivot 61 with an end cap 63 to prevent the pivot 61 from escaping out, a root part of the pivot 61 can be also sheathed with a flat washer 64 that is abutted at a front end of the jacket tube 55 to reduce a friction force between an end surface of the jacket tube 55 and the head tube 60. In addition, the lining of the flat washer 64 can avoid direct abrasion to the end surface of the jacket tube 55 or to the head tube 60.

Under a structural configuration that the abovementioned head tube reset mechanism is further provided at the tail end of the pivot 61 with an end cap 63 to prevent the pivot 61 from escaping out, whether or not a root part of the pivot 61 is sheathed with a flat washer 64 that is abutted at a front end of the jacket tube 55, the end cap 63 can be locked at the tail end of the pivot 61 by a set screw 65 that is screwed with the pivot 61.

Moreover, under a structural configuration that the abovementioned end cap 63 is locked at the tail end of the pivot 61 by the set screw 65 which is screwed with the pivot 61, the pivot 61 can be a hollow tube. Besides that, an interior of the pivot 61 is welded with a screw fastener 66 that is screwed with the set screw 65, so that the end cap 63 can be locked at the tail end of the pivot 61 and can be prevented from escaping out. In addition, the head tube 60 and the connector 50 can be assembled and dismantled conveniently.

It is worthy of mentioning that the head tube reset mechanism for a scooter, according to the present invention, includes the connector 50 for installing the rear wheels 32 and the head tube 60 for installing the front wheel 31 and the handle 23. Therefore, the assembly structure of the rear wheels and the assembly structure of the front wheel can be changed quickly, and the rear wheel assembly structure can be even quickly swapped with the front wheel assembly structure, thereby facilitating the modularized design for the scooter.

For example, as shown in the embodiment in FIG. 3, the connector 50 is provided with two rod members 80 and a tail end of each rod member 80 is installed with a rear wheel 32. In addition, the head tube 60 can be sheathed with a stem 21 that can rotate freely. An upper end of the stem 21 is installed with a handle 23 and a lower end of the stem 21 is installed with a front fork 22 and a front wheel 31. Therefore, a scooter that can be ridden stably is achieved.

It is preferred that the two sides of the connector 50 are extended backward and outward in a diagonal direction and two side walls of the connector 50 can be further provided with a predetermined number of filling holes 53, so that the rod members 80 and the connector 50 can be assembled quickly by the filling holes 53, and the rod members 80 at the two sides of the connector 50 can be stretched backward and outward by a predetermined included angle. Therefore, the rear wheels 32 that are installed at the tail ends of the two rod members 80 and the front wheel 31 that is installed at the head tube 60 are in a triangular configuration, which provides a more stable riding effect.

At least an elastic restoration element (not shown in the drawings) is disposed between the abovementioned each rod member 80 and the connector 50, so that when riding the scooter, the rider can step his or her feet on the rod members 80 (or footsteps 81 that are installed on the rod members 80) respectively, and carry out outward expansion and inward collection at a same time with the two feet stepping on the rod members 80. Therefore, while the two rod members 80 are continuously collected inward and expanded outward, the two rear wheels 32 can swing along with the rod members 80 and move forward along an S-shaped route.

In comparison with the prior art, the head tube reset mechanism for a scooter, according to the present invention, is provided with the simple structures, which reduces material cost, assembling cost and subsequent maintenance fees. In particular, the entire head tube reset mechanism for a scooter is constructed by the connector for installing the rear wheels and the head tube for installing the front wheel and the handle, which facilitates the modularized design for the scooter.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A head tube reset mechanism for a scooter, comprising a connector for installing rear wheels, and a head tube for installing a front wheel and a handle, wherein a front end of the connector is provided with a jacket tube and a filling slot that keeps a predetermined spacing from the jacket tube; the head tube is installed at the front end of the connector, and is provided with a pivot to be sheathed into the jacket tube and a limiting unit that is extended into the filling slot; and an elastomer is installed between the filling slot of the connector and the limiting unit of the head tube.

2. The head tube reset mechanism for a scooter, according to claim 1, wherein the connector is constructed by welding a stamping panel with the jacket tube, and the filling slot is disposed between the jacket tube and the stamping panel.

3. The head tube reset mechanism for a scooter, according to claim 2, wherein the jacket tube is provided with a sliding sleeve.

4. The head tube reset mechanism for a scooter, according to claim 1, wherein the limiting unit is constructed by connecting two panels that are fixed on the head tube, ends of the two panels opposite to the head tube are engaged together to form a plate with structural intensity, and ends of the two panels facing the head tube are folded to form a joint part to be engaged with the head tube.

5. The head tube reset mechanism for a scooter, according to claim 4, wherein an elastomer is installed between the filling slot of the connector and the limiting unit of the head tube, the elastomer is installed in the filling slot of the connector, and a front end of the elastomer is formed with an interference part for insertion with the limiting unit of the head tube; or two elastomers are installed between the filling slot of the connector and the limiting unit of the head tube, and the two elastomers are disposed respectively at two sides of the limiting unit of the head tube, so as to be installed in the filling slot of the connector.

6. The head tube reset mechanism for a scooter, according to claim 1, wherein an elastomer is installed between the filling slot of the connector and the limiting unit of the head tube, the limiting unit is constructed by a slot-shaped plate that is fixed on the head tube and an end of the limiting unit opposite to the head tube is formed with an opening, the elastomer is disposed in the limiting unit, the connector is protruded at the filling slot with a plate unit that is extended into the limiting unit, and an end of the elastomer facing the connector is provided with an interference part for insertion with the plate unit.

7. The head tube reset mechanism for a scooter, according to claim 1, wherein two elastomers are installed between the filling slot of the connector and the limiting unit of the head tube, the limiting unit is constructed by a slot-shaped plate that is fixed on the head tube and an end of the limiting unit opposite to the head tube is formed with an opening, the connector is protruded at the filling slot with a plate unit that is extended into the limiting unit, and the two elastomers are disposed respectively at two sides of the head tube, so as to be installed in the limiting unit.

8. The head tube reset mechanism for a scooter, according to claim 1, wherein an elastomer is installed between the filling slot of the connector and the limiting unit of the head tube, the filling slot of the connector is a round hole, the elastomer is an elastic cylinder that is installed in the filling slot, the elastomer is provided with an interference part for insertion with the limiting unit of the head tube, the limiting unit is a rod-shaped unit that is fixed on the head tube, and the interference part of the elastomer is a round hole.

9. The head tube reset mechanism for a scooter, according to claim 1, wherein the head tube is provided at a tail end of the pivot with an end cap to prevent the pivot from escaping out.

10. The head tube reset mechanism for a scooter, according to claim 1, wherein two sides of the connector are installed respectively with a rod member, and a tail end of each rod member is installed with a rear wheel, an elastic restoration element is disposed between each rod member and the connector, the head tube is sheathed with a stem that rotates freely, an upper end of the stem is installed with a handle, and a lower end of the stem is installed with a front fork and a front wheel.

* * * * *